United States Patent
Kang et al.

(10) Patent No.: US 8,510,680 B2
(45) Date of Patent: Aug. 13, 2013

(54) THREE-DIMENSIONAL MOTION GRAPHIC USER INTERFACE AND METHOD AND APPARATUS FOR PROVIDING THE SAME

(75) Inventors: Hyun-joo Kang, Seoul (KR); Sung-woo Kim, Seoul (KR); Joo-kyung Woo, Seoul (KR); Joon-ho Ok, Seoul (KR); Jung-bong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1465 days.

(21) Appl. No.: 11/188,776

(22) Filed: Jul. 26, 2005

(65) Prior Publication Data

US 2006/0020888 A1 Jan. 26, 2006

(30) Foreign Application Priority Data

Jul. 26, 2004 (KR) .................. 10-2004-0058265

(51) Int. Cl.
  *G06F 3/048* (2006.01)
(52) U.S. Cl.
  USPC ........................... 715/848; 715/768; 715/769
(58) Field of Classification Search
  USPC ............... 715/708, 782, 746, 781, 836, 838, 715/854, 759, 762, 764, 768–771, 848–852
  See application file for complete search history.

(56) References Cited

U.S. PATENT DOCUMENTS

| | | | | |
|---|---|---|---|---|
| 5,301,268 A * | 4/1994 | Takeda | | 719/329 |
| 5,386,507 A * | 1/1995 | Teig et al. | | 715/836 |
| 5,602,564 A | 2/1997 | Iwamura et al. | | |
| 5,608,850 A * | 3/1997 | Robertson | | 345/427 |
| 5,678,015 A * | 10/1997 | Goh | | 715/782 |
| 5,838,326 A * | 11/1998 | Card et al. | | 715/775 |
| 5,900,879 A * | 5/1999 | Berry et al. | | 345/419 |
| 5,995,106 A * | 11/1999 | Naughton et al. | | 715/854 |
| 6,262,734 B1 * | 7/2001 | Ishikawa | | 715/850 |
| 6,281,877 B1 | 8/2001 | Fisher et al. | | |
| 6,344,863 B1 | 2/2002 | Capelli et al. | | |
| 6,538,675 B2 * | 3/2003 | Aratani et al. | | 715/856 |
| 6,572,476 B2 * | 6/2003 | Shoji et al. | | 463/33 |
| 6,597,358 B2 * | 7/2003 | Miller | | 345/427 |
| 6,621,509 B1 | 9/2003 | Eiref et al. | | |
| 6,636,246 B1 | 10/2003 | Gallo et al. | | |
| 6,693,652 B1 * | 2/2004 | Barrus et al. | | 715/838 |
| 6,710,788 B1 * | 3/2004 | Freach et al. | | 715/778 |
| 6,774,914 B1 * | 8/2004 | Benayoun | | 345/650 |
| 6,907,579 B2 * | 6/2005 | Chang | | 715/850 |
| 6,909,443 B1 * | 6/2005 | Robertson et al. | | 715/782 |
| 6,938,218 B1 * | 8/2005 | Rosen | | 715/850 |
| 7,043,695 B2 * | 5/2006 | Elber et al. | | 715/771 |
| 7,216,305 B1 * | 5/2007 | Jaeger | | 715/849 |
| 7,409,647 B2 * | 8/2008 | Elber et al. | | 715/848 |
| 7,681,140 B2 * | 3/2010 | Ebert | | 715/769 |
| 7,788,323 B2 * | 8/2010 | Greenstein et al. | | 709/204 |
| 7,839,400 B2 * | 11/2010 | Kurtenbach et al. | | 345/419 |
| 7,882,446 B2 * | 2/2011 | Takayama et al. | | 715/765 |
| 7,922,582 B2 * | 4/2011 | Miyamoto et al. | | 463/30 |
| 2003/0142136 A1 * | 7/2003 | Carter et al. | | 345/782 |
| 2004/0004638 A1 * | 1/2004 | Babaria | | 345/805 |
| 2005/0022139 A1 * | 1/2005 | Gettman et al. | | 715/850 |

\* cited by examiner

*Primary Examiner* — Omar Abdul-Ali
*Assistant Examiner* — Andrew Tank
(74) *Attorney, Agent, or Firm* — Sughrue Mion, PLLC

(57) ABSTRACT

A three-dimensional motion graphic user interface includes a first polyhedron component which exists in a first space, and a second polyhedron component which exists in a second space, wherein the first polyhedron component includes identification information that identifies the second polyhedron component, and if an information object selected by a user is located inside the first polyhedron component, the information object is moved inside the second polyhedron component using the identification information.

27 Claims, 17 Drawing Sheets

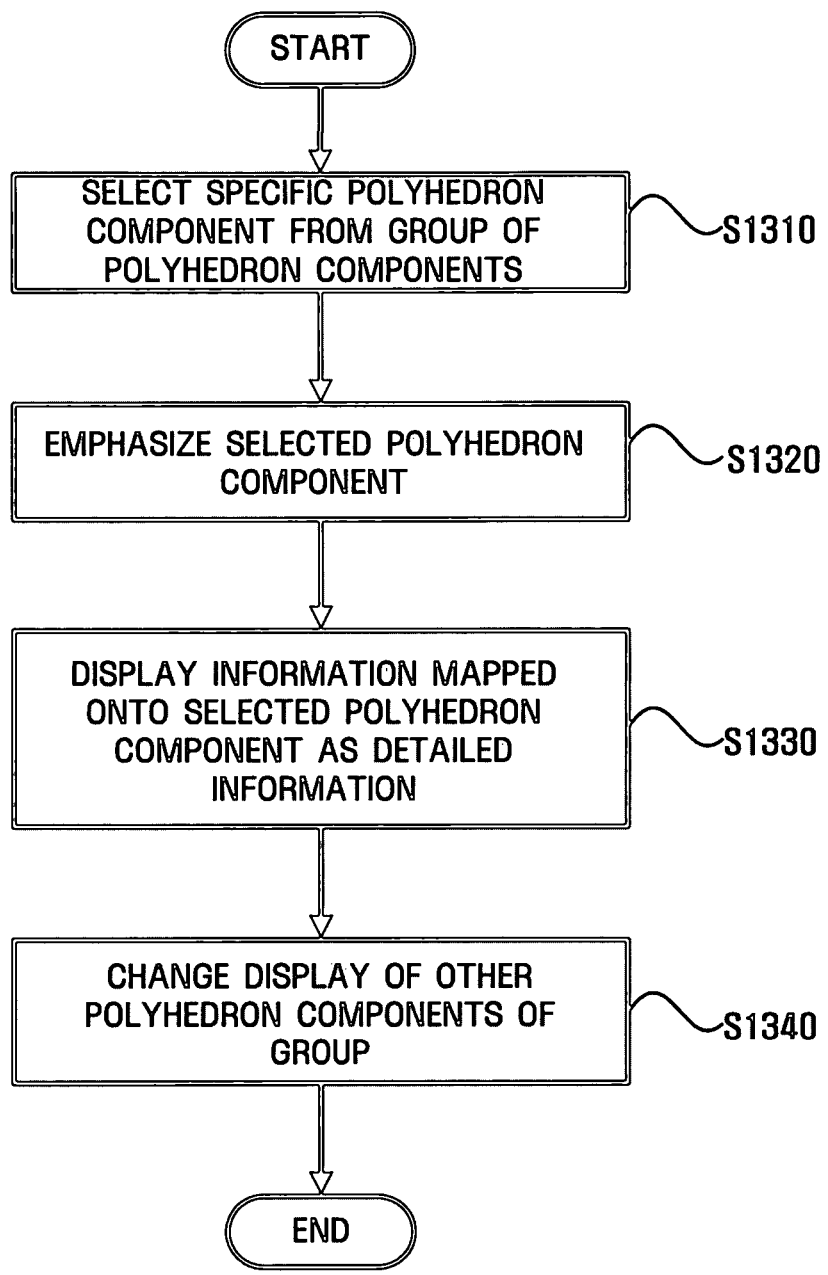

FIG. 16
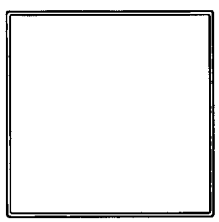
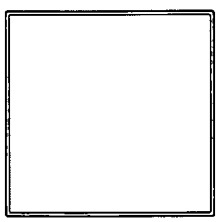
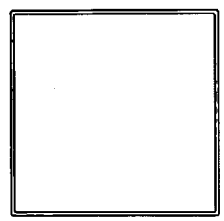
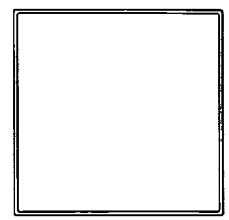
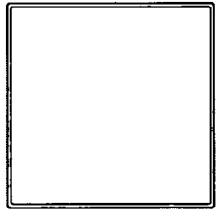
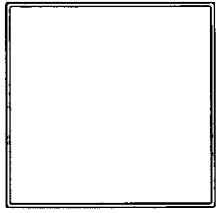
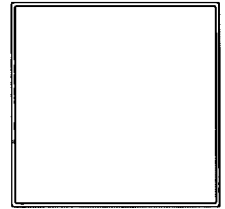
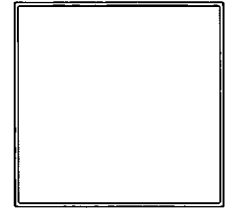
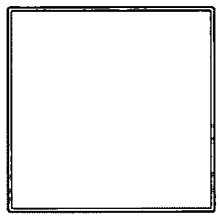
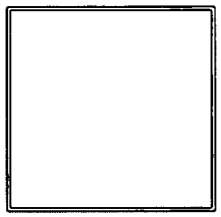
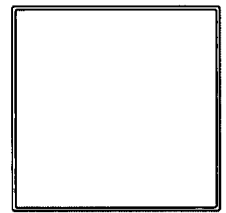

MOVEMENT PATH LIST

PATH INPUT WINDOW

THREE-DIMENSIONAL MOTION GRAPHIC USER INTERFACE AND METHOD AND APPARATUS FOR PROVIDING THE SAME

CROSS-REFERENCE TO RELATED APPLICATION

This application claims priority from Korean Patent Application No. 10-2004-0058265 filed on Jul. 26, 2004 in the Korean Intellectual Property Office, the disclosure of which is incorporated herein by reference in its entirety.

BACKGROUND OF THE INVENTION

1. Field of the Invention

Apparatuses and methods consistent with the present invention relate to a three-dimensional motion graphic user interface (MGUI), and more particularly, to providing a user interface, in which visual effects and information use efficiency are improved by providing information to a three-dimensional user interface that changes dynamically according to user's actions.

2. Description of the Related Art

User interfaces (UI) of conventional digital devices use graphic user interface (GUI) components of personal computer (PC) operating systems. As a result, most UIs have been two-dimensional, and even in the case of three-dimensional UIs, most of them are static and have features that are similar to those of conventional two-dimensional UIs.

FIG. 1 illustrates a user interface (UI) using a graphic user interface (GUI) component supported in a conventional PC operating system.

Conventional UIs are two-dimensional and static. As a result, information displayed by UIs usually takes the form of text and is insufficient to satisfy user's emotions. Thus, the effectiveness with which visual information can be provided is limited. Although three-dimensional components exist among components provided by conventional GUIs, they still fall into the two-dimensional concept, and although they are viewed as three-dimensional, their advantages as three-dimensional structures are not fully utilized in their application. GUIs of PC operating systems are not suitable for all digital devices. Also, in particular, in the case of devices that provide multimedia contents, conventional UIs are limited in the extent to which they can satisfy a user's emotions and provide entertainment functions. To solve the foregoing problems, various solutions (e.g., U.S. Pat. No. 6,344,863, entitled "Three-Dimensional GUI Windows with Variable-Speed Perspective Movement") have been suggested, but the problems still remain unsolved. Therefore, there is a need for a dynamic and realistic UI for digital devices that provide a variety of contents.

SUMMARY OF THE INVENTION

The present invention provides a method and apparatus for providing information that is intuitive and satisfies user's emotions by providing a UI that uses a three-dimensional component.

According to an aspect of the present invention, there is provided a GUI including a first polyhedron component which exists in a first space, and a second polyhedron component which exists in a second space, wherein the first polyhedron component includes identification information that identifies the second polyhedron component, and if an information object selected by a user is located inside the first polyhedron component, the information object is moved inside the second polyhedron component using the identification information.

According to another aspect of the present invention, there is provided an apparatus for providing a user interface, the apparatus including a control module which creates a polyhedron component having identification information that identifies another polyhedron component that exists in a space that is different from that of the created polyhedron component, a storing module which stores the polyhedron component that is created by the control module, an input module to which position information of an information object selected by a user is input, a user interface module which compares the position information of the information object and position information of the polyhedron component created by the control module and changes the position information of the information object to position the information object inside the another polyhedron component identified by the identification information if the information object is located inside the created polyhedron component, and an output module which displays a processing result of the user interface module.

According to still another aspect of the present invention, there is provided a method for providing a user interface, the method including (a) moving an information object selected by a user to a polyhedron component having identification information that identifies another polyhedron component that exists in a space that is different from that of the polyhedron component, (b) providing the information object at a location inside the polyhedron component having the identification information, and (c) moving the information object inside the another polyhedron component identified by the identification information.

According to a further aspect of the present invention, there is provided a graphic user interface including a polyhedron component in which event activation information is set, and an information object in which an event is generated, wherein the event is generated according to the event activation information if the information object is located inside the polyhedron component.

According to yet another aspect of the present invention, there is provided a method for providing a user interface, the method including a position relationship between a polyhedron component in which event activation information is set and an information object in which an event is generated being changed, the information object being located inside the polyhedron component, and the event being generated according to the event activation information.

BRIEF DESCRIPTION OF THE DRAWINGS

The above and other aspects of the present invention will become more apparent by describing in detail exemplary embodiments thereof with reference to the attached drawings in which:

FIG. 13 is a flowchart illustrating a process of displaying information by a user interface using a plurality of polyhedron components;

FIGS. 14 through 19 illustrate exemplary embodiments in which groups of a plurality of polyhedron components are presented;

DETAILED DESCRIPTION OF EXEMPLARY EMBODIMENTS OF THE INVENTION

Figure 1:
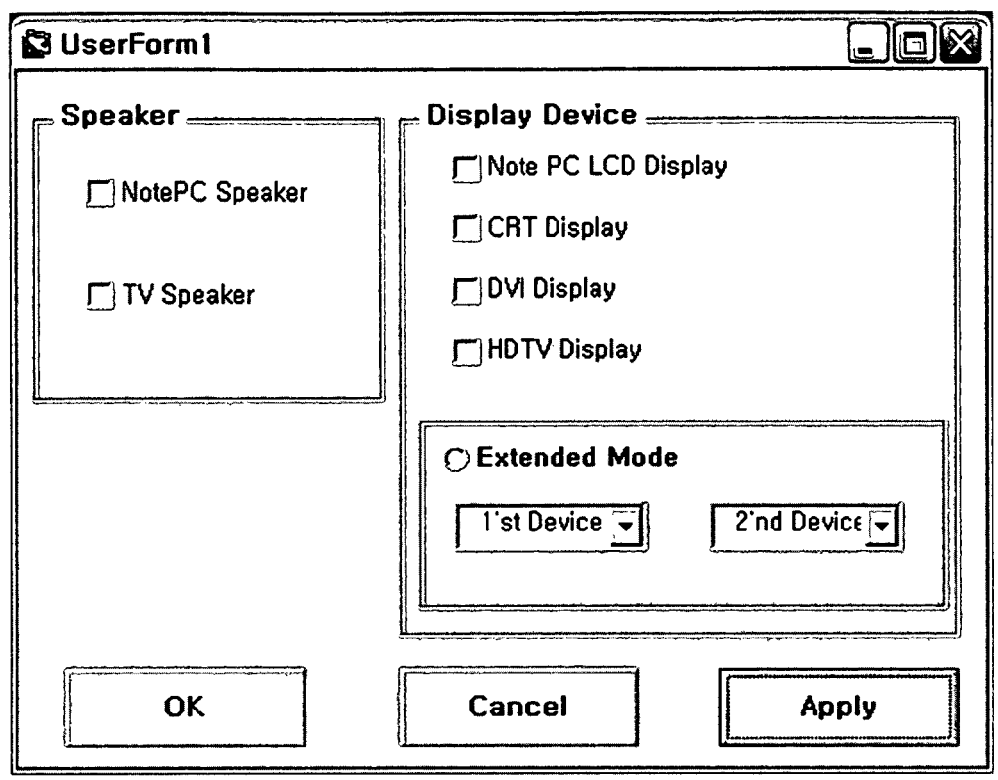
FIG. 1 illustrates a UI using a GUI component supported in a conventional PC operating system.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of an MGUI according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 2:
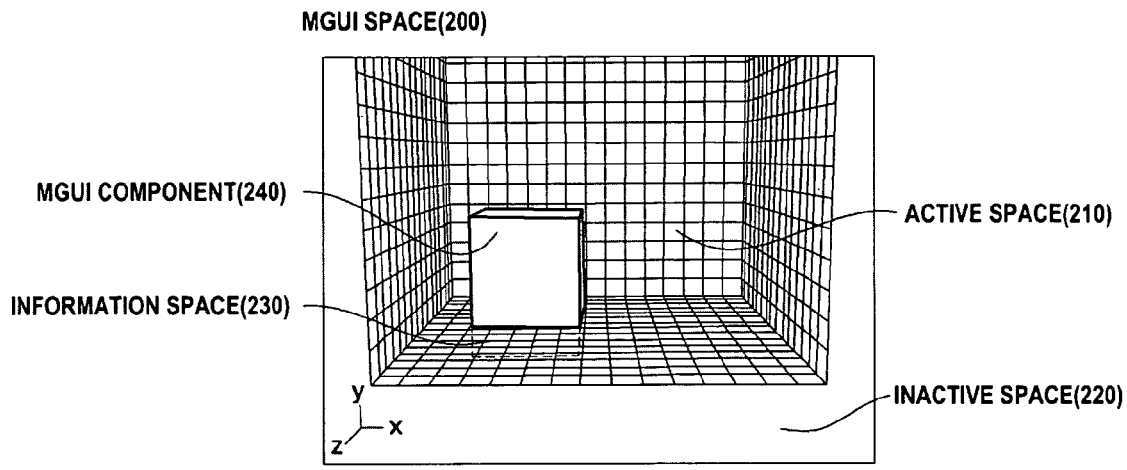
FIG. 2 illustrates the overall configuration of an MGUI according to an exemplary embodiment of the present invention.

FIG. 2 illustrates the overall configuration of an MGUI according to an exemplary embodiment of the present invention.

An MGUI is a UI capable of establishing a more dynamic GUI environment through a three-dimensional environment and motion graphics.

An MGUI environment includes the following:
1. MGUI space,
2. MGUI component,
3. MGUI component presentation,
4. MGUI camera view, and
5. MGUI information face and information space.

An MGUI space 200 is a space for establishing the MGUI environment and is divided into an active space 210 and an inactive space 220 according to the characteristic of a space. The active space 210 can be used when a UI is designed. To present an MGUI component 240 provided in the MGUI in the active space 210, an area for an information space 230 should be designated within the active space 210. In other words, the information space 230 is an area where the MGUI component 240 can be actually placed within the active space 210. Also, the information space 230 is an area secured for smooth manipulation of information and space management.

The MGUI component 240 is a configuration object of the MGUI that provides information to a user while the user is interacting with it in the MGUI environment. The MGUI component 240 includes at least one information face. The MGUI component 240, and elements of the MGUI component 240, the information face, and the information space 230 will be described in detail later with reference to FIG. 3.

Presentation of the MGUI component 240 involves determining a way to manipulate a group of at least one component in the information space 230, motion generated during the manipulation, and how to present the component on a screen. Presentation of the MGUI component 240 will be described in detail later with reference to FIGS. 13 through 19.

The MGUI camera view is a viewpoint in the MGUI environment. Viewpoint movement means navigation in the MGUI space 200 and motion is generated in the entire MGUI space 200. The MGUI camera view is the main cause of motion in the MGUI environment, along with inherent motion attributes of the MGUI component 240, which will be described in detail later with reference to FIG. 12.

Figure 3:
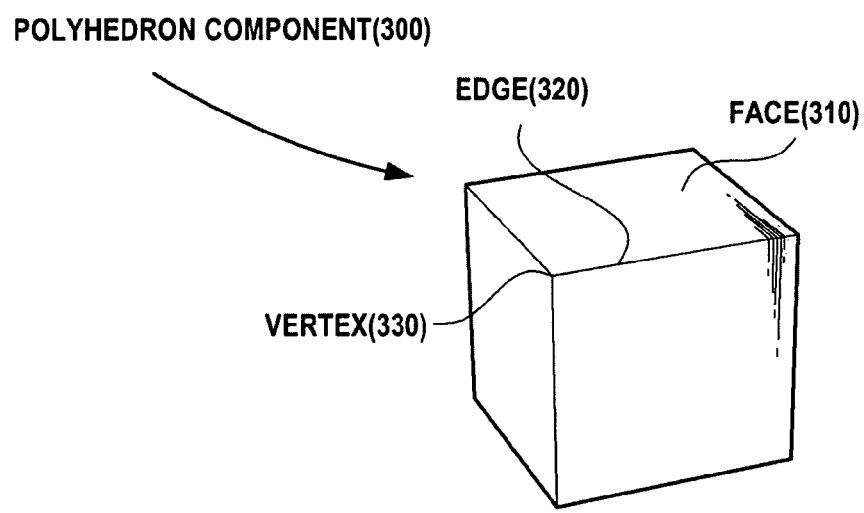
FIG. 3 illustrates an exemplary embodiment of a polyhedron component included in the MGUI.

FIG. 3 illustrates an exemplary embodiment of a polyhedron component 300 included in the MGUI.

The polyhedron component 300 includes a plurality of faces 310, edges 320, and vertexes 330. A polyhedron is a three-dimensional figure having at least four faces, examples of which include a tetrahedron, a pentahedron, and a hexahedron. A sphere may be assumed to be an example of a polyhedron formed of numerous faces. Here, to facilitate explanation of the present invention, a hexahedron will be taken as an example of a polyhedron.

The polyhedron component 300 has the following attributes. That is, the polyhedron component 300 has an identifier and a size as attributes of a polyhedron. The faces 310 have attributes of a number, a color, transparency, and information on whether a corresponding face is an information face. In addition, the edges 320 have attributes of edge colors. Here, these attributes are not limited to those mentioned above and a variety of attributes may exist according to application fields.

In addition, the information face means a face on which information can be displayed among a plurality of faces forming the polyhedron component. The information face will be described in detail later with reference to FIGS. 4A and 4B.

An information face of an MGUI corresponds to a window of a conventional GUI. In the MGUI, the information face is subject to the MGUI component and such subjection to the MGUI component can be made in the following two manners. First, the information face can exist as a face. Second, the information face can exist as a visualized form (e.g., the information face 420 of FIG. 4A) separated from the polyhedron. In other words, subjection of the information face to the MGUI component means that the information face operates in connection with the MGUI component and displays information, regardless of whether the information face forms the polyhedron component of the MGUI or takes another form separated from faces forming the polyhedron component.

Figure 4A:
FIG. 4A illustrates an exemplary embodiment in which information is mapped onto faces of a polyhedron component.

FIG. 4A shows a polyhedron component 410 of the MGUI that takes the form of a hexahedron having six faces, each of which has attributes of an information face and displays information. A square next to the polyhedron (hexahedron) component 410 is an information face 420 visualized on a screen, like a single component. In this case, the information face is displayed on a screen as a two-dimensional plane having no depth like a window of a conventional GUI. When information displayed by the polyhedron (hexahedron) component 410 changes or the polyhedron (hexahedron) component 410 operates, information changes and operates accordingly.

Figure 4B:
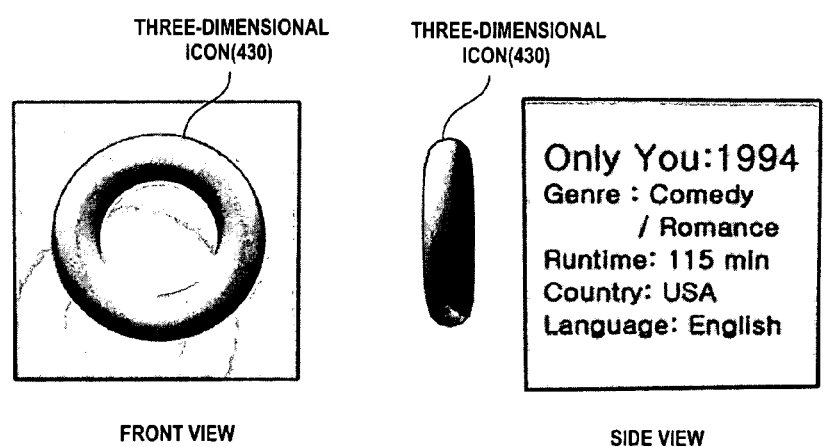
FIG. 4B illustrates a case where information mapped onto a face of the polyhedron component is three-dimensional information.

Texts, images, moving images, and two-dimensional widgets that are two-dimensional visual information can be displayed on the information face 420. Three-dimensional information 430 such as three-dimensional icons can also be displayed on the information face 420, as shown in FIG. 4B. In this case, the three-dimensional information 430 can be regarded as being attached onto the information face 420.

If the information face is defined according to attributes of the MGUI component, the form in which information is displayed on the information face may vary with attributes assigned to the polyhedron component. For example, the size of or amount of information displayed on the information face may change according to the size of the polyhedron component in which the information face is defined or the size of the information face.

Figure 5:
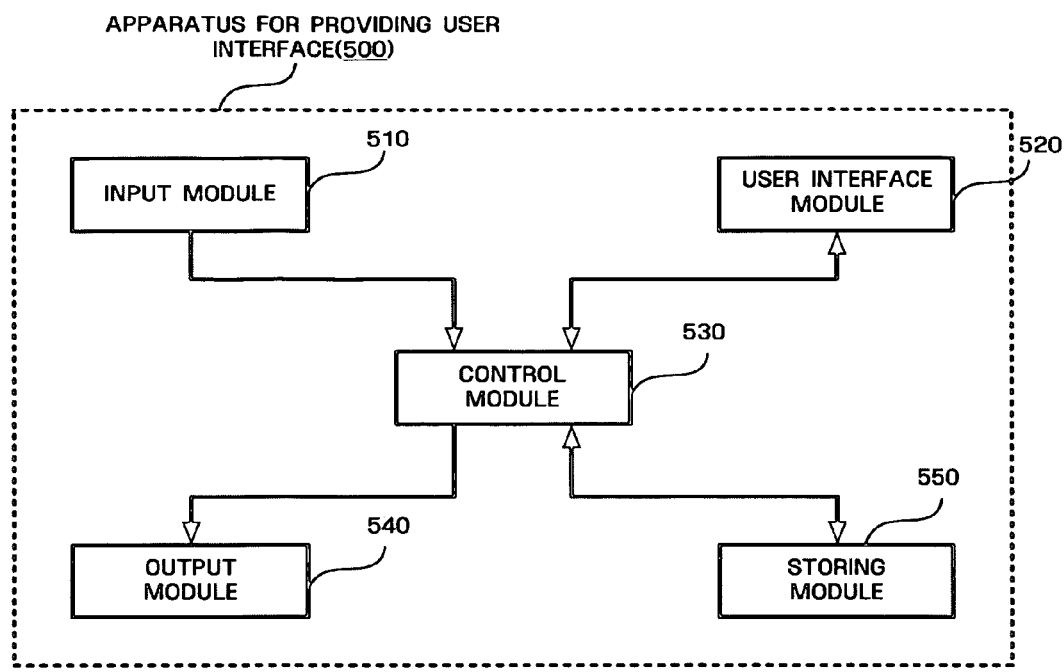
FIG. 5 is a block diagram of an apparatus for providing a three-dimensional MGUI according to an exemplary embodiment of the present invention.

FIG. 5 is a block diagram of an apparatus 500 for providing a three-dimensional MGUI according to an exemplary embodiment of the present invention.

The apparatus 500 for providing a three-dimensional MGUI according to an exemplary embodiment of the present invention may be a digital device. Here, the apparatus 500 for providing a three-dimensional MGUI may be a digital device. Here, the digital device has a digital circuit that processes digital data, examples of which may include a computer, a printer, a scanner, a pager, a digital camera, a facsimile, a digital photocopier, a personal digital assistant (PDA), a mobile phone, a digital appliance, a digital telephone, a digital projector, a home server, a digital video recorder, a digital TV broadcast receiver, a digital satellite broadcast receiver, and a set-top box.

The apparatus 500 for providing a three-dimensional MGUI according to the present invention includes an input module 510, a user interface module 520, a control module 530, an output module 540, and a storing module 550.

The term "module", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The control module 530 creates an MGUI space or a polyhedron component and connects and manages different modules.

The storing module 550 stores the MGUI space or the polyhedron component created by the control module 530.

Data about a user's action with respect to a polyhedron component is input to the input module 510. The user's action includes accessing a polyhedron component, selecting a specific polyhedron component, selecting a specific information face of a polyhedron component or a specific menu on an information face, and operating a polyhedron component.

The output module 540 displays data processed by the user interface module 520 using a display device.

The user interface module 520 will be described with reference to FIG. 6.

Figure 6:
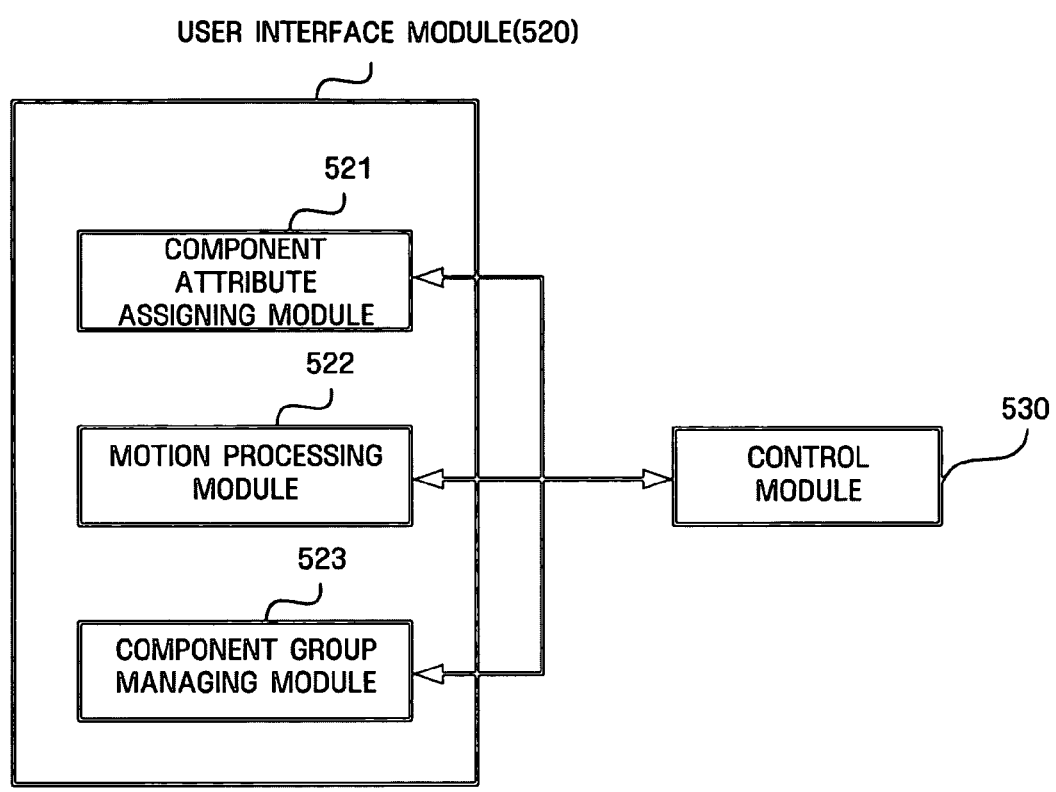
FIG. 6 is a detailed block diagram of a user interface module shown in FIG. 5.

Referring to FIG. 6, the user interface module 520 provides a user interface using the MGUI space or the polyhedron component created by the control module 530. The user interface module 520 includes a component attribute assigning module 521, a motion processing module 522, and a component group managing module 523.

The component attribute assigning module 521 assigns the attributes described with reference to FIG. 3 to the polyhedron component created by the control module 530 and maps information displayed on an information face of the polyhedron component according to the assigned attributes.

The motion processing module 522 processes motion of a polyhedron component in an MGUI space according to the data about a user's action, which is input through the input module 510 and maps information displayed on an information face of the polyhedron component or information objects contained in the internal space of the polyhedron component through the component attribute assigning module 521 according to motion.

The component group managing module 523 receives data about a specific polyhedron selected by a user from a group of polyhedron components, highlights the selected polyhedron, and modifies information mapped onto an information face of the selected polyhedron through the component attribute assigning module 521. Also, the component group managing module 523 changes display forms of other polyhedron components that are not selected in the group. As such, the user interface module 520 includes modules 521, 522 and 523 that are divided according to their respective functions and data about a user interface processed by the modules undergoes the control module 530 and is displayed by the output module 540.

Figure 7:
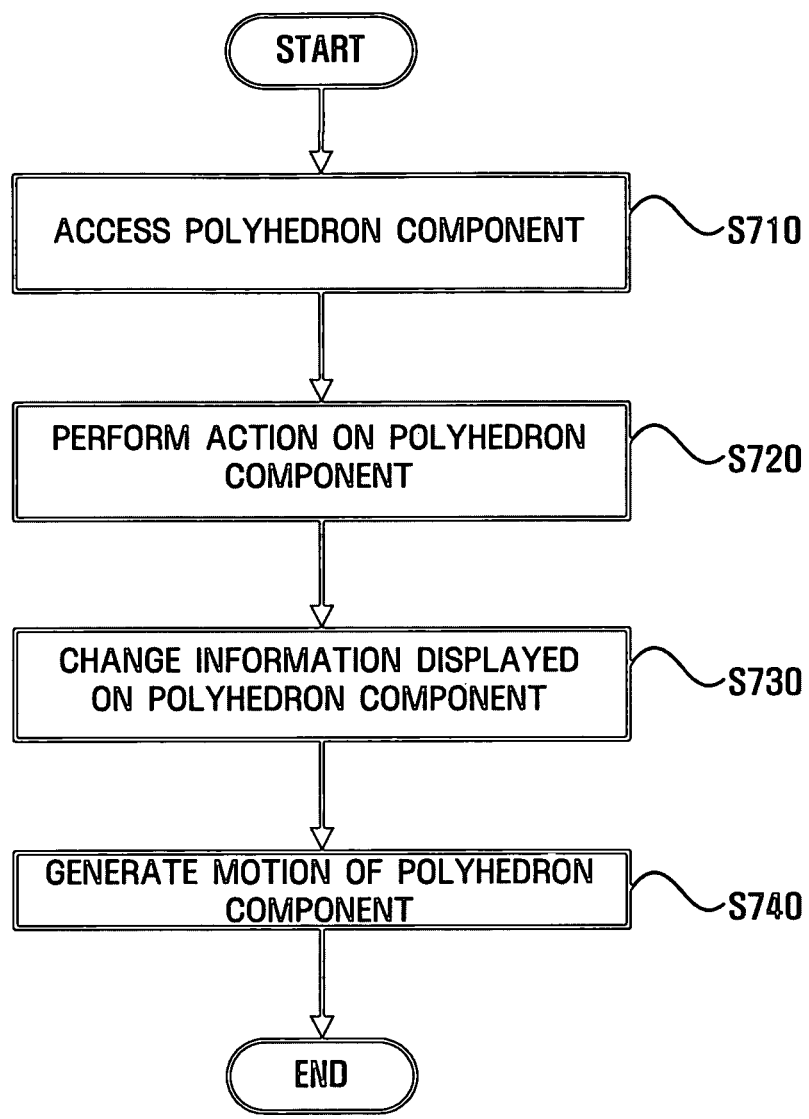
FIG. 7 is a flowchart illustrating a process of generating motion of a polyhedron component in response to a user's action.

FIG. 7 is a flowchart illustrating a process of generating motion of a polyhedron component in response to a user's action.

A polyhedron component of an MGUI is a dynamic three-dimensional UI component whose motion is generated according to a user's action. A process of generating motion is as follows. A user accesses a polyhedron component in operation S710 and performs a specific action on the polyhedron component in operation S720. Information displayed on information faces of the polyhedron component changes according to a user's action in operation S730 and motion of the polyhedron component is generated in operation S740.

In another exemplary embodiment, motion of a polyhedron component may be generated without a change in information displayed on information faces of the polyhedron component. An example of such a polyhedron component is a space jump event helper. A description will be made later regarding the space jump event helper.

A user can access a polyhedron component (operation S710) by accessing a specific polyhedron component that displays information of interest in an MGUI environment. Access can be made using various input devices such as a mouse, a keyboard, a keypad, or a touch pad.

The user's action on the polyhedron component can be performed (operation S720) by selecting a specific menu on an information face of the polyhedron component, moving or rotating the polyhedron component, or changing the size of the polyhedron component to search for necessary information. Selection of a specific menu and movement or rotation of the polyhedron component can be performed using various input devices such as a mouse, a keyboard, a keypad, or a touch pad. For example, selection of a specific menu can be made by clicking a selection button on a keypad, and movement or rotation of the polyhedron component can be performed using an arrow button on the keypad. In another exemplary embodiment, if a polyhedron component whose motion is to be generated is specified, motion menus that can be selected by a user pop up on the screen and the user can perform an action on the polyhedron component by selecting a motion menu corresponding to the action.

The input module 510 of the apparatus 500 provides data about the user's access or action to the user interface module 520 through the control module 530.

When a user performs an action on the polyhedron component, information displayed on information faces of the polyhedron component can be changed according to the user's action. This is achieved by modifying information mapped onto the information faces by the component attribute assigning module 521 of the user interface module 520. For example, if a user selects a specific menu on a specific information face in operation S720, the component attribute assigning module 521 maps sub-menus or sub-information of a selected menu onto the information faces of the polyhedron component and the output module 540 displays a result of mapping.

Motion of the polyhedron component, generated by the user's action, is processed by a motion processing module 522 of the user interface module 520. The motion processing module 522 processes the position of the polyhedron component according to motion or data required for display and displays a result of processing through the output module 540.

Alternatively, all faces forming the polyhedron component may be unfolded into the plane to allow the user to recognize information on the information faces with a single glance, without changing the information on the information faces according to the user's action.

Motion of the polyhedron component includes a position change, a size change, rotation, and spring lock. Here, a reference face for the motion may be a front face of the polyhedron component or a face that is opposite to the user. In another exemplary embodiment, the user may select a motion reference face using various input devices. In still another exemplary embodiment, a pointer is placed on a motion reference face and the user may select the motion reference face by moving the pointer. Each type of motion will be described with reference to FIGS. 8 through 12B.

Figure 8:
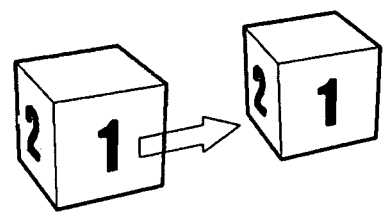
FIG. 8 illustrates an exemplary embodiment in which the position of a polyhedron component changes during motion of the polyhedron component.

FIG. 8 illustrates an exemplary embodiment in which the position of a polyhedron component changes during motion of the polyhedron component.

After a user selects a specific polyhedron component, the user designates a corresponding position to which the selected polyhedron component is to be moved using various input devices, thereby moving the selected polyhedron component to the designated position. For example, if a mouse is used as the input device, the user selects a desired polyhedron component by clicking the polyhedron component using the mouse and drags the clicked polyhedron component to a desired position.

Figure 9:
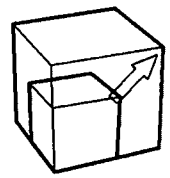
FIG. 9 illustrates an exemplary embodiment in which the size of the polyhedron component changes during motion of the polyhedron component.

FIG. 9 illustrates an exemplary embodiment in which the size of the polyhedron component changes during motion of the polyhedron component.

A user selects a polyhedron component whose size is to be reduced or enlarged and changes the size of the polyhedron component. For example, if a mouse is used as the input device, the size of the polyhedron component can be reduced or enlarged by selecting and dragging a vertex of the polyhedron component.

Figure 10:
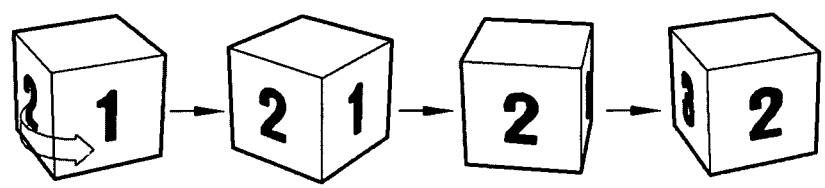
FIG. 10 illustrates an exemplary embodiment in which the polyhedron component rotates during its motion.

FIG. 10 illustrates an exemplary embodiment in which the polyhedron component rotates during its motion.

In FIG. 10, a hexahedron rotates to the right in the X-axis direction. However, the polyhedron component may rotate an arbitrary angle in the direction of an arbitrary axis as well as the X-axis, the Y-axis, or the Z-axis.

Figure 11:
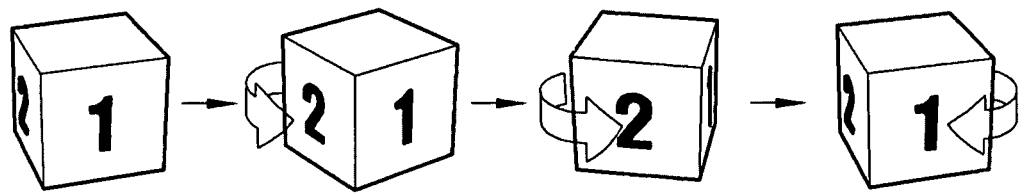
FIG. 11 illustrates an exemplary embodiment in which the polyhedron component is spring-locked during its motion.

FIG. 11 illustrates an exemplary embodiment in which the polyhedron component is spring-locked during its motion.

Spring lock means the polyhedron component rotates by a desired angle in a predetermined direction according to a user's action and returns to its original state if the user's action causing the rotation is released. In another exemplary embodiment, the polyhedron component may remain in a rotated state and then return to its original state upon a user's specific manipulation.

As described above, motion of the polyhedron component is generated by a user's direct action, but may also be generated by a change in the MGUI space (a change in division type of an active space and reduction or enlargement of the active space) or movement in a camera view that is a viewpoint in the MGUI space.

Figure 12A:
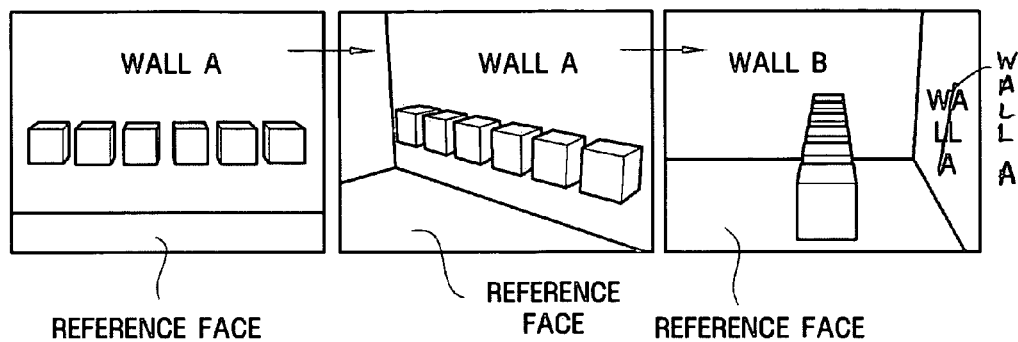
FIG. 12A illustrates an exemplary embodiment in which motion of the polyhedron component is generated according to changes in a camera view.

FIG. 12A illustrates an exemplary embodiment in which motion of the polyhedron component is generated according to changes in a camera view.

In FIG. 12A, as the camera view rotates counter-clockwise, all the polyhedron components in an MGUI space appear to rotate clockwise. In addition, if the camera view is zoomed out, all polyhedron components in the MGUI space look reduced in size. If the camera view is zoomed in, all polyhedron components in the MGUI space look enlarged.

Figure 12B:
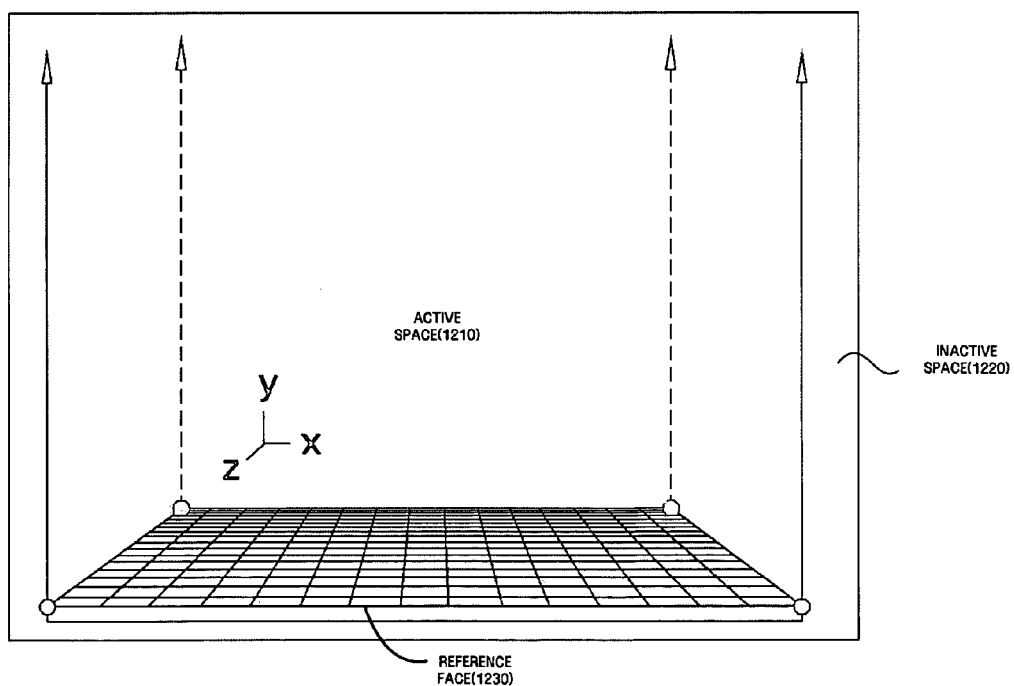
FIG. 12B illustrates an MGUI space according to a division of the MGUI space into an active space and an inactive space.

FIG. 12B illustrates an MGUI space according to a division of the MGUI space into an active space and an inactive space.

As described with reference to FIG. 2, a polyhedron component may be located only in the active space of the MGUI space. Thus, since the position of the polyhedron component changes according to how the MGUI space is divided into the active space and the inactive space, the polyhedron component may look different to the user. In FIG. 12B, an active space 1210 is unlimited above a reference face 1230 along the Y-axis with limits along the X-axis and Z-axis. In other words, an area limited along the X-axis and Z-axis is defined as the reference face 1230 and the active space 1210 is unlimited above the reference face 1230 along the Y-axis. Thus, the polyhedron component can be located only in the active space 1210 inside a column defined with arrows and cannot be located in an inactive space 1220 outside the column and under the reference face 1230. In another exemplary embodiment, the MGUI space may be divided into a plurality of active spaces. In this case, presentation of groups of a plurality of polyhedron components may change according to how the MGUI space is divided into the plurality of active spaces.

The MGUI may include a plurality of polyhedron components. By managing a plurality of polyhedron components as a group, it is possible to give unity to presentation or movement in a UI and provide a user with a UI that is efficient for information search.

FIG. 13 is a flowchart illustrating a process of displaying information by a user interface using a plurality of polyhedron components.

If a user selects a specific polyhedron component from a group of polyhedron components in operation S1310, the selected polyhedron component is emphasized in operation S1320. Information mapped onto an information face of the selected polyhedron component may be displayed as detailed information in operation S1320. The other polyhedron components from the group are displayed differently from the selected polyhedron component in operation S1340.

User's selection of a specific polyhedron component from a group of polyhedron components (operation S1310) can be made by accessing and selecting the specific polyhedron component using various input devices like a mouse, a keyboard, a keypad, and a touch pad.

If the user selects a specific polyhedron component using various input devices, the input module 510 transfers information about user's selection to the component group managing module 523 of the user interface module 510 through the control module 530.

After completion of user's selection, the selected polyhedron component is emphasized in operation S1320. Such an emphasis may be made by enlarging the selected polyhedron component or moving the selected polyhedron component close to the user in the Z-axis direction. In another exemplary embodiment, for the emphasis, the color of the selected polyhedron component may be changed or the edges of the selected polyhedron component may be marked with bold lines. In still another exemplary embodiment, the selected polyhedron component may be marked with a focus or other marks. If a specific polyhedron component is selected, an information face of the selected polyhedron component may display more detailed information than the information mapped by the component attribute assigning module 521, in operation S1330. Alternatively, the selected polyhedron component can be emphasized by reducing the size of the other polyhedron components from the group, moving the other polyhedron components away from the user, or fading the colors of the other polyhedron components, and information continuity is implemented in operation S1340. Operation S1340 is performed by the component group managing module 523 and the component attribute assigning module 521.

FIGS. 14 through 19 illustrate exemplary embodiments in which groups of a plurality of polyhedron components are presented.

Figure 14:
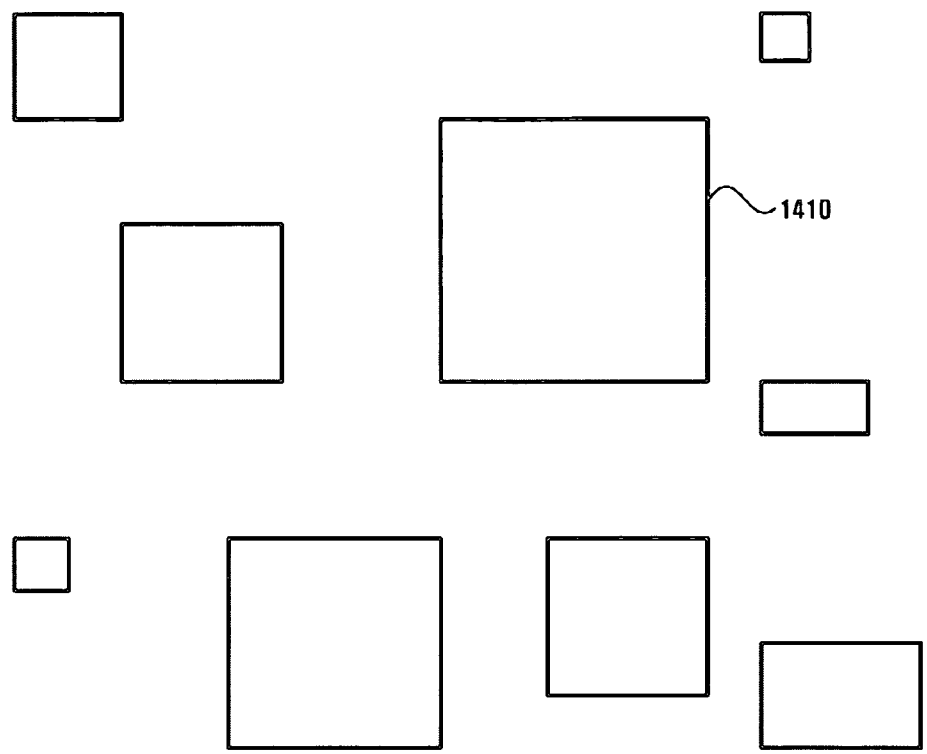

Specifically, FIG. 14 shows presentation in which changes are made to the display sizes of the polyhedron components to allow a user to intuitively recognize information of importance or unimportance. In other words, information of a polyhedron component that is closer to the user in the Z-axis direction is more important, and information of the polyhedron component that is more away from the user in the Z-axis direction is less important. Thus, if a polyhedron component that is away from the user in the Z-axis direction is pulled forward, it can be enlarged. If a polyhedron component that is close to the user in the Z-axis direction is pushed backward, it can be reduced in size. At this time, as a selected polyhedron component 1410 is enlarged, neighboring polyhedron components that may collide with the enlarged polyhedron component are reduced in size. Also, a specific polyhedron component is selected, it can be enlarged. Selection of a polyhedron component can be made by moving a user's focus or horizontally or vertically moving components while fixing a user's focus.

Figure 15:
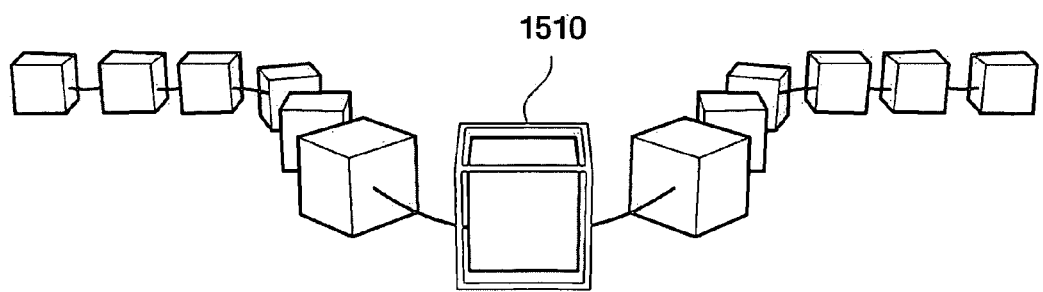

FIG. 15 shows presentation in which only a selected polyhedron component 1510 is enlarged and other polyhedron components are displayed gradually smaller for natural connection between information. In such presentation, a plurality of polyhedron components can be connected in the form of a curved line as shown in FIG. 15. In another exemplary embodiment, a plurality of polyhedron components can be connected in the form of a circle or a straight line. Selection of a polyhedron component can be made by moving a user's focus or horizontally or vertically moving components while fixing a user's focus.

FIG. 16 shows presentation in which polyhedron components of the same size are arranged in the form of a lattice and a selected polyhedron component is enlarged to a full screen. Such presentation spreads information to briefly show a large amount of information. If a user selects a desired component for more detail information, the selected component is enlarged.

Figure 17:
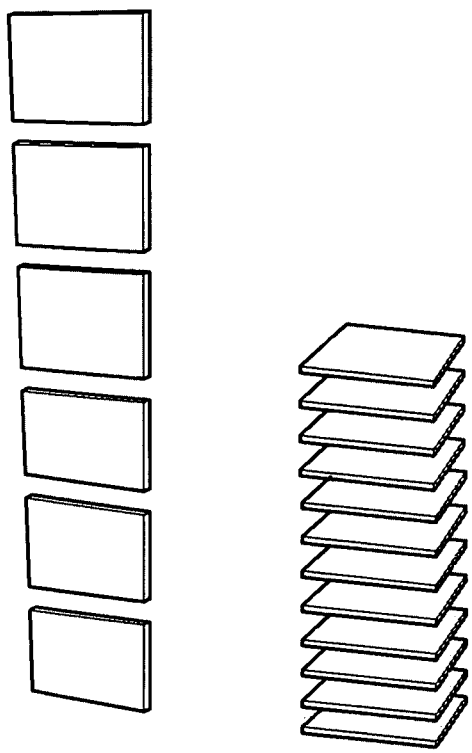

FIG. 17 shows a presentation in which various polyhedron components of the same size on which information is displayed are spread in a line or stacked one on top of the other. Thus, such a presentation as shown in FIG. 17 allows a user to coherently search for desired information by one-way viewing. If the user vertically moves polyhedron components using an input device and selects a specific component, a space is created above the selected polyhedron component to display more detail information. Selection of a component can be made by moving a user's focus or horizontally or vertically moving components while fixing a user's focus.

Figure 18:
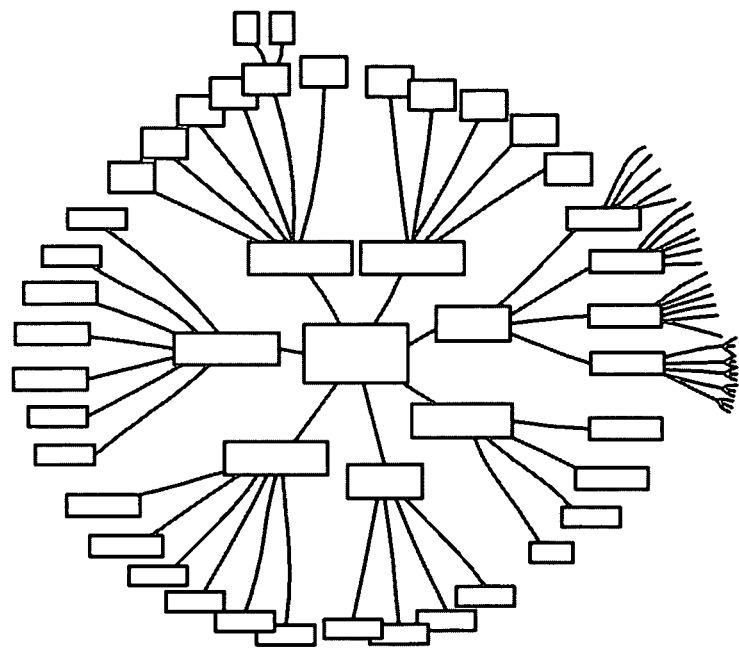

FIG. 18 shows presentation in which a plurality of polyhedron components is arranged in a radial form to allow a user to recognize a tree structure of information with a single glance. If the user selects a component on which information of interest is displayed, the selected component is enlarged and related information is displayed. At this time, neighboring components that are not selected are reduced in size or moved away from the user.

Figure 19:
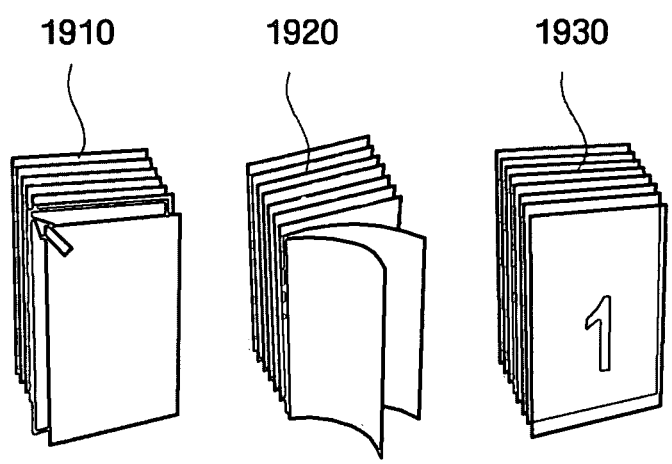

FIG. 19 shows presentation in which information faces displaying a large amount of information overlap one another. Thus, information of a currently selected component is positioned frontmost and other information of unimportance is positioned behind the selected component. Also, the user can take out one of overlapping information faces in the following manners.

First, an information face designated by the user is slid out (1910), and the direction of sliding and a time point and a position at which sliding is stopped can be set different when a UI is designed. Second, like if a page of a book is actually turned over, all the information faces in front of an information face designated by a user are flipped (1920) to show the designated information face. Third, all the information faces in front of the designated information face are displayed transparent (1930).

Various components constituting an MGUI environment have been described. In particular, there is a special MGUI component called an event helper.

The event helper triggers an event that is set in an arbitrary MGUI object. The event may be set in a newly created MGUI object. A specific event may be set in the event helper and applied to an MGUI object. Examples of the event helper in which a specific event is set include an activation event helper, a space jump event helper, and an attraction event helper. Hereinafter, such examples will be described.

(1) Activation Event Helper

If an object contacts or is moved inside an activation event helper, a corresponding event starts according to event activation information that is set in an event of the object or the activation event helper. In the latter case, for example, if an object having a moving image is moved inside an activation event helper having event activation information indicating moving image reproduction, a moving image is automatically reproduced. In another exemplary embodiment of the present invention, if a document object is moved inside an activation event helper having event activation information indicating document editing, an application program for document editing is automatically executed.

(2) Space Jump Event Helper

In a state where two space jump event helpers in two different active spaces are connected, if an object is located entirely or partially inside one of the two space jump event helpers, the object is moved inside the other space jump event helper connected to the one of the two space jump event helpers.

In other words, a space jump event helper allows for efficient movement between information in the use of information of a three-dimensional space. Thus, once movement between spaces is set using a space jump event helper, a user can naturally follow information flow and connection through a movement path that is rapidly and dynamically provided. At this time, the movement path may be set by identification information that identifies a connected event helper. Preferably, but not necessarily, the identification information may be the name or position coordinates of the connected event helper.

The basic form of a space jump event helper may be, preferably, a semi-transparent hexahedron, but may be one of various polyhedrons such as a triangle, a square, a hexahedron, or a circular dial. Also, the space jump event helper may be only formed by lines without a face or information may be displayed on a face of the space jump event helper.

Figure 20:
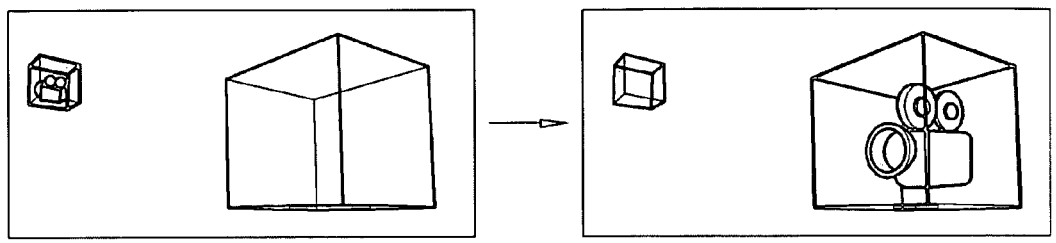
FIG. 20 illustrates spatial movement of a moving image object using a space jump event helper according to an exemplary embodiment of the present invention.

FIG. 20 illustrates momentary spatial movement of a moving image object using a space jump event helper according to an exemplary embodiment of the present invention. There are two ways of spatially moving the moving image object. One is momentary movement in which the moving image object is momentarily moved without showing a movement path. The other is path movement in which the movement path is shown. Momentary movement is also divided into a way of showing the locus of the movement path and a way of rapidly showing movement of the moving image object without showing the locus of the movement path. FIG. 20 illustrates spatial movement of the moving image object through momentary movement.

Once movement between spaces is set using a space jump event helper in this way, a movement path is rapidly and dynamically provided, thereby allowing a user to easily follow information flow and connection.

Figure 21:
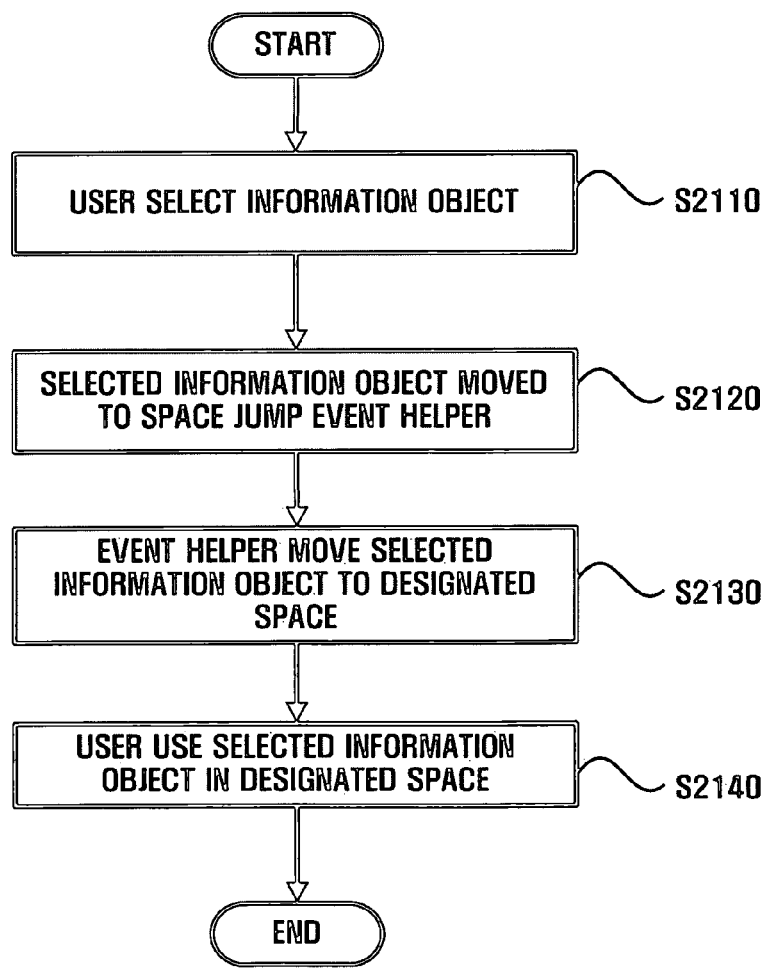
FIG. 21 is a flowchart illustrating the operation of the space jump event helper according to an exemplary embodiment of the present invention.

FIG. 21 is a flowchart illustrating the operation of the space jump event helper according to an exemplary embodiment of the present invention.

First, in operation S2110, a user selects an information object to be spatially moved. In operation S2120, the selected information object is moved inside a space jump event helper in a space where the selected information object exists. At this time, the space jump event helper has identification information that identifies a space jump event helper that exists in a designated space. Preferably, but not necessarily, the identification information may be the name of an event helper, the name of a space in which an event helper exists, or the position coordinates of an event helper. Thus, the information object selected by the user is moved inside a space jump event helper that exists in a designated space with reference to the identification information, in operation S2130. Then the user can use the selected information object in the designated space in operation S2140.

FIGS. 22A through 22D are views for explaining designation of a path between space jump event helpers according to an exemplary embodiment of the present invention.

Figure 22A:
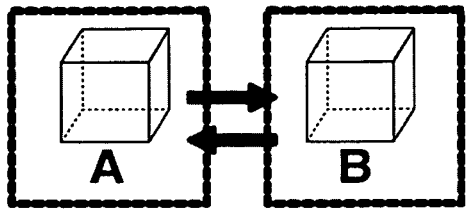
FIGS. 22A through 22D are views for explaining designation of a path between space jump event helpers according to an exemplary embodiment of the present invention.

FIG. 22A is a view for explaining designation of a path between space jump event helpers that exist in two different spaces. A path for movement to a space jump event helper B is designated in a space jump event helper A, and a path for movement to the space jump event helper A is designated in the space jump event helper B.

Figure 22B:
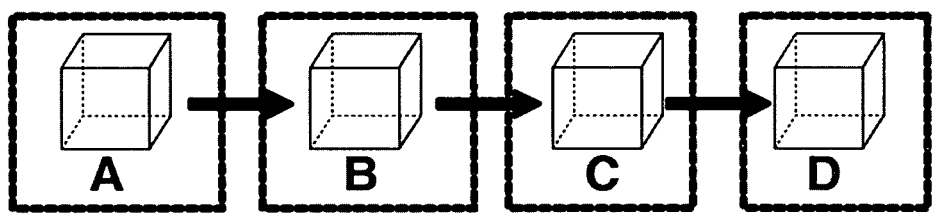

FIG. 22B is a view for explaining designation of a path between space jump event helpers that exist in two different spaces. A path for movement to a space jump event helper B is designated in a space jump event helper A, a path for movement to a space jump event helper C is designated in the space jump event helper B, and a path for movement to a space jump event helper D is designated in the space jump event helper C. Therefore, an information object can be consecutively moved to different spaces.

Figure 22C:
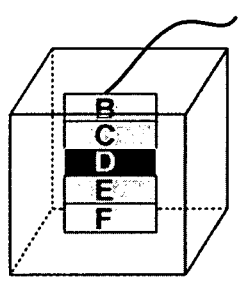

FIG. 22C illustrates a space jump event helper including information about a movement path list in which a plurality of movement paths is designated. Thus, a user can move an information object to a desired space jump event helper or space along a selected one of the plurality of movement paths.

Figure 22D:
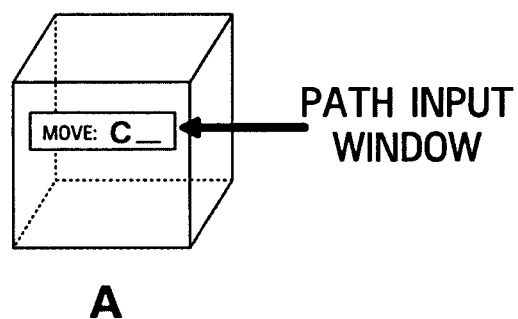

FIG. 22D illustrates a space jump event helper to which a user inputs a movement path. To this end, the space jump event helper includes a path input window to which the user can input a movement path. The user can move an information object to a desired space by directly inputting the name of a desired space jump event helper or space.

Figure 23:
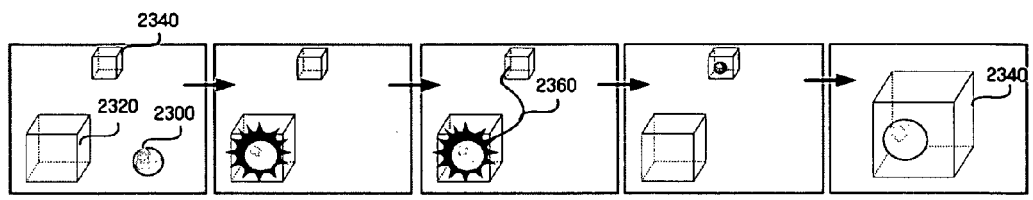
FIG. 23 illustrates spatial movement of an information object using a space jump event helper according to an exemplary embodiment of the present invention.

FIG. 23 illustrates spatial movement of an information object using a space jump event helper according to an exemplary embodiment of the present invention. In FIG. 23, the information object is moved to another space shown in the same screen.

A first space jump event helper 2320 and a second space jump event helper 2340 exist in different spaces, and a current information object 2300 exists in the same space as the first space jump event helper 2320. If a user desires to move the information object 2300 to a space in which the second space jump event helper 2340 exists, the information object 2300 is moved to the second space jump event helper 2340 along a movement path 2360. As the second space jump event helper 2340 including the information object 2300 moves closer to the user in the screen, the space in which the second space jump event helper 2340 exists and the information object 2300 are enlarged. Thus, the user can use the information object 2300 in the enlarged space.

Figure 24:
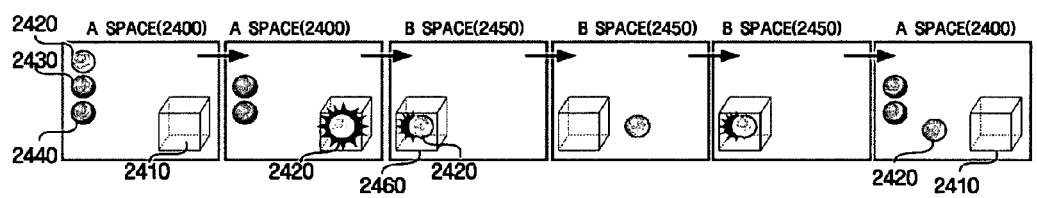
FIG. 24 illustrates spatial movement of an information object using a space jump event helper according to another exemplary embodiment of the present invention.

FIG. 24 illustrates spatial movement of an information object using a space jump event helper according to another exemplary embodiment of the present invention. In FIG. 24, the information object is moved to another space that is not shown in a current screen.

If a user desires to move an information object 2420 from a current space A 2400 to a space B 2450, the user activates a space jump event helper 2410 by moving the information object 2420 to the space jump event helper 2410 that exists in the space A 2400. At this time, the information object 2420 is moved to a space jump event helper 2460 that exists in the space B 2450, the space A 2400 disappears from the screen, and the space B 2450 emerges on the screen. If the user desires to move the information object 2420 back to the space A 2400, the space jump event helper 2460 is activated by moving the information object 2420 to the space jump event helper 2460 that exists in the space B 2450. At this time, the information object 2420 is moved to the space jump event helper 2410 that exists in the space A 2400, the space B 2450 disappears from the screen, and the space A 2400 emerges on the screen.

Figure 25A:
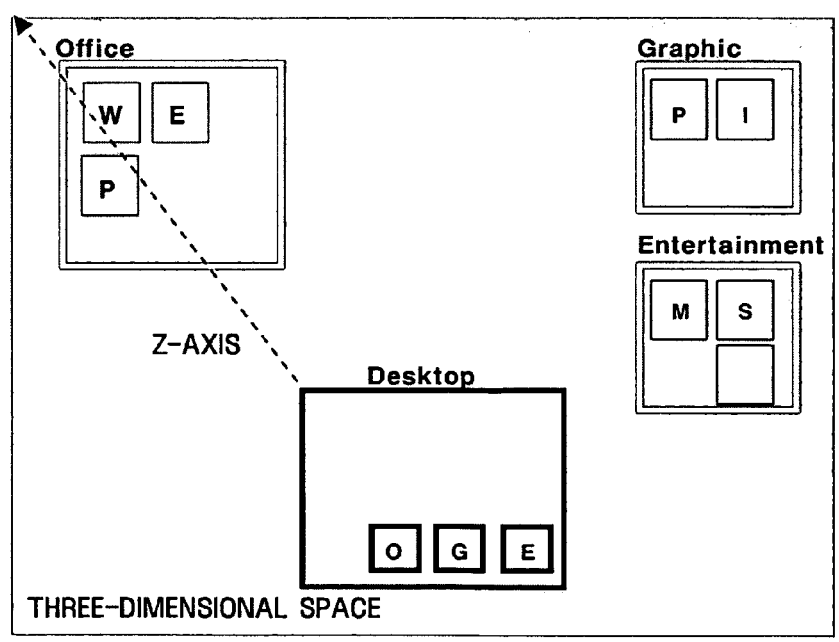
FIGS. 25A and 25B illustrate movement of a work space using a space jump event helper according to an exemplary embodiment of the present invention.
Figure 25B:
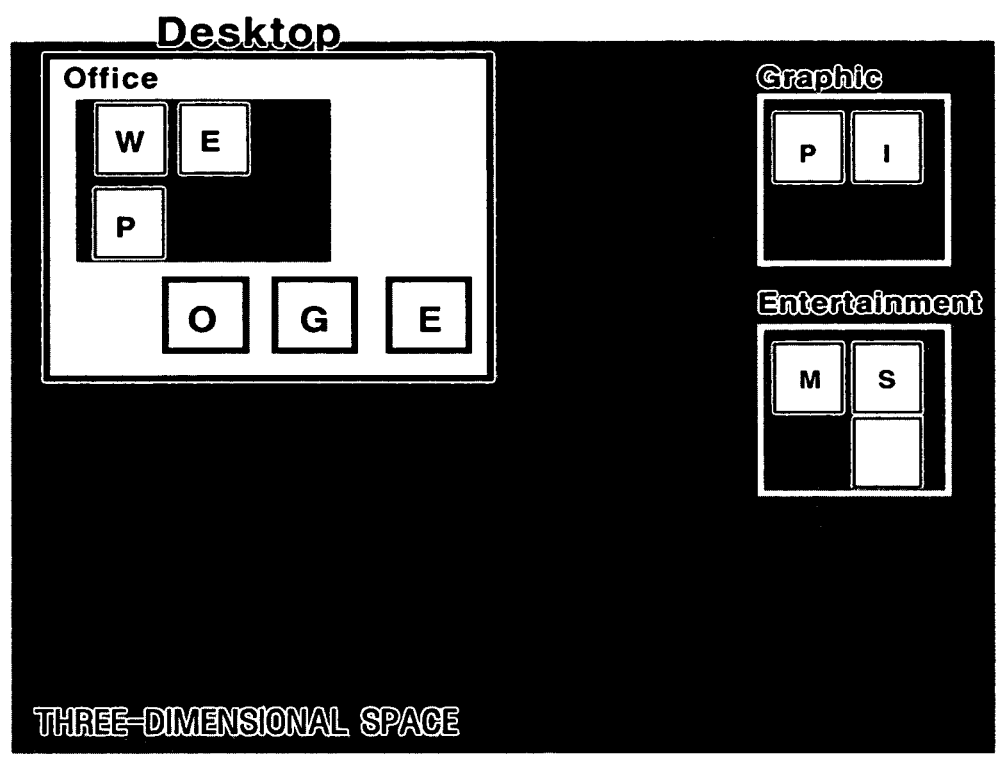

FIGS. 25A and 25B illustrate movement of a work space using a space jump event helper according to an exemplary embodiment of the present invention.

For example, it is assumed that a user uses a three-dimensional space including an office work area, a graphic work area, and an entertainment work area.

As shown in FIG. 25A, space jump event helpers for movement to respective work areas exist in a current desktop screen. O indicates a space jump event helper for movement to the office work area, G indicates a space jump event helper for movement to the graphic work area, and E indicates a space jump event helper for movement to the entertainment work area. Each of the space jump event helpers includes movement path information for movement to respective work areas. Preferably, but not necessarily, the movement path information includes the name of a space jump event helper that exists in each of the work area or the name of a space in which each of the work area exists.

If a user desires to use a program for document editing on the desktop screen, the user selects the space jump event helper O among those shown in FIG. 25A. Thus, the user can use a desired program by moving the desktop screen to the office work area as shown in FIG. 25B.

In another exemplary embodiment of a space jump event helper, if a document that is edited by the user in a current user interface environment is long, rapid movement between or correction of documents may be possible using a marker function. The space jump event helper may take the place of a marker if document editing is performed in a three-dimensional space.

(3) Attraction Event Helper

An attraction event helper attracts other objects that satisfy attraction conditions as if a magnet attracts iron. An MGUI developer should set attraction conditions if manufacturing an attraction event helper. For example, in the case of an attraction event helper in which an attraction condition indicating moving image media searching is set, if a user drags the attraction event helper in an MGUI environment, objects including moving images gather around the attraction event helper.

An event helper can have various basic attributes. For example, if an event helper is a hexahedron, it has colors of faces, colors of lines, the transparency of faces, the size of the hexahedron, numbers indicating the faces, information about whether or not a face is an information face, the name of the hexahedron, a special option, an event (in the case of an activation event), information about a connected event helper (in the case of a space jump event helper), an attraction condition (in the case of an attraction event helper), and an event trigger condition.

The colors of faces or lines may be set to values corresponding to colors supported in an MGUI environment established system.

The transparency of faces ranges from 0 (most transparent) to 100 (most opaque).

The size of the hexahedron is larger than 0 and numbers indicating the faces may be consecutive numbers from 0 to 5.

The information about whether or not a face is an information face can be indicated by TRUE or FALSE, and information can be displayed on a face indicated by TRUE. Also, all the faces of the hexahedron may be information faces.

The name of the hexahedron may be designated using text-form codes supported in an MGUI environment established system.

The special option indicates whether an event helper is an activation event helper, a space jump event helper, or an attraction event helper.

The event may be at least one of supported events if the event helper is an activation event helper.

If the event helper is a space jump event helper, the information about the connected event helper may be designated as identification information of a space jump event helper that exists in another activation space. Preferably, but not necessarily, the identification information may be the name of an event helper.

If the event helper is an attraction event helper, the attraction condition may be at least one of supported attraction conditions.

The event trigger condition indicates whether an object only contacts the event helper or should be located entirely inside the event helper to trigger the event by the event helper.

Figure 26:
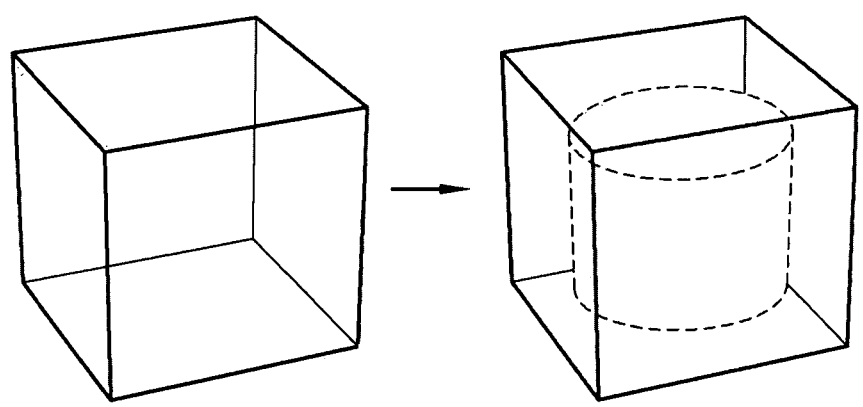
FIG. 26 illustrates motion of an event helper according to an exemplary embodiment of the present invention.

Since the event helper also corresponds to an MGUI component, it has motion. For example, if an object is moved entirely or partially inside a space jump event helper, the external form of the object is changed into dotted lines as if the object is covered with a net. Thus, it can be recognized that the event helper and the object interoperate with each other. FIG. 26 illustrates motion of the event helper. If an attraction option is set, objects that satisfy the attraction condition gather around the attraction event helper. At this time, objects contacting the attraction event helper may move, being attached to the attraction event helper.

A user may move the event helper on the screen to cause the event helper to contact or include another object.

Since the event helper also corresponds to an MGUI component, it can be created and provided to a user through a block structure described with reference to FIGS. 5 and 6. Hereinafter, a space jump event helper will be taken as an example of the event helper.

In the apparatus 500 for providing a three-dimensional MGUI that provides an event helper, the control module 530 creates an event helper including identification information that identifies another event helper that exists in another space. At this time, the identification information may be the name or position coordinates of an event helper, and information about and position information of the created event helper are stored in the storing module 550.

Once a user selects a specific information object through the input module 510, the control module 530 provides position information of the information object selected through the input module 510 and the position information of the event helper stored in the storing module 550 to the user interface module 520.

The user interface module 520 compares the provided position information. If the information object is determined to be located entirely or partially inside the event helper, the user interface module 520 changes the position information of the information object such that the information object can be positioned inside another event helper identified by the identification information. At this time, the control module 530 may control the user interface module 520 to extract information about another event helper identified by the identification information from the storing module 550 and provide the extracted information to the user interface module 520. To indicate that the information object interoperates with the event helper, the external form of the information object may be changed into dotted lines.

The control module 530 receives results processed by the user interface module 520 and provides the received results to the output module 540, and the output module 540 displays the results.

Meanwhile, since an event helper corresponds to an MGUI component, the same process as described in FIG. 7 can be applied to a process of generating a motion of a polyhedron component in response to a user's action.

According to the present invention, it is possible to provide information that is intuitive and satisfies user's emotions by providing a dynamic three-dimensional UI using a three-dimensional component.

In addition, according to the present invention, a user can naturally follow information flow and connection through a movement path that is rapidly and dynamically provided by setting movement between spaces using a space jump event helper.

It will be understood by those of ordinary skill in the art that various changes in form and details may be made therein without departing from the spirit and scope of the present invention as defined by the following claims. Therefore, the scope of the invention is given by the appended claims, rather than the preceding description, and all variations and equivalents which fall within the range of the claims are intended to be embraced therein.

What is claimed is:

1. A computer program product for enabling a computer to implement a graphic user interface, the computer program product comprising:
    software instructions for enabling the computer to implement the graphic user interface; and
    a non-transitory computer-readable medium bearing the software instructions;
    the graphic user interface comprising:
        a first polyhedron component which exists in a first space at first position coordinates; and
        a second polyhedron component which exists in a second space at second position coordinates,
        wherein identification information that identifies the second polyhedron component is set to the first polyhedron component, and
        when a display location of an information object selected by a user is moved to the first polyhedron component at the first position coordinates, the display location of the information object is automatically moved to a location of the second polyhedron component at the second position coordinates using the set identification information.

2. The computer program product of claim 1, wherein the first polyhedron component and the second polyhedron component are hexahedrons.

3. The computer program product of claim 1, wherein the first polyhedron component and the second polyhedron component are semi-transparent polyhedron components.

4. The computer program product of claim 1, wherein the identification information comprises names of the first polyhedron component and the second polyhedron component.

5. The computer program product of claim 1, wherein the identification information comprises the first position coordinates of the first polyhedron component and the second position coordinates of the second polyhedron component.

6. The computer program product of claim 1, wherein if the information object selected by the user is located entirely inside the first polyhedron component, an external form of the information object is changed into dotted lines.

7. The computer program product of claim 1, wherein if the information object selected by the user is located partially inside the first polyhedron component, the information object is moved inside the second polyhedron component using the identification information.

8. The computer program product of claim 7, wherein if the information object selected by the user is located partially inside the first polyhedron component, an external form of the information object is changed into dotted lines.

9. The computer program product of claim 1, wherein the display location of the information object is moved inside the second polyhedron component at the second position coordinates using the identification information, and a viewpoint in the graphic user interface changes such that the second space appears enlarged to a user.

10. An apparatus for providing a user interface, the apparatus comprising:
    a control module which creates a first polyhedron component in a first space at first position coordinates having identification information that identifies a second polyhedron component in a second space at second position coordinates;

a storing module which stores the first polyhedron component;

an input module to which a display location of an information object selected by a user is input;

a user interface module which compares the display location of the information object and the first position coordinates of the first polyhedron component and changes the display location of the information object to a location of the second polyhedron component at the second position coordinates if the information object is determined to be moved to the first polyhedron component at the first position coordinates by the comparison; and an output module which displays a processing result of the user interface module.

11. The apparatus of claim 10, wherein the first polyhedron component is a hexahedron.

12. The apparatus of claim 10, wherein the first polyhedron component is a semi-transparent polyhedron component.

13. The apparatus of claim 10, wherein the identification information comprises a name of the second polyhedron component.

14. The apparatus of claim 10, wherein the identification information comprises the second position coordinates of the second polyhedron component.

15. The apparatus of claim 10, wherein the interface module compares the display location of the information object and the first position coordinates of the first polyhedron component and changes an external form of the information object into dotted lines if the information object is located entirely inside the first polyhedron component.

16. The apparatus of claim 10, wherein the interface module compares the display location of the information object and the first position coordinates of the first polyhedron component and changes the display location of the information object to position the information object inside the second polyhedron component identified by the identification information if the information object is located partially inside the first polyhedron component.

17. The apparatus of claim 16, wherein the interface module compares the display location of the information object and the first position coordinates of the first polyhedron component and changes the external form of the information object into dotted lines if the information object is located partially inside the first polyhedron component.

18. A method for providing a user interface, the method comprising:
(a) setting, in a memory, identification information that identifies a second polyhedron component at second position coordinates to a first polyhedron component at first position coordinates, wherein the second polyhedron component exists in a space that is different from that of the first polyhedron component;

(b) moving a display location of an information object selected by a user to the first polyhedron component at the first position coordinates; and (c) moving the display location of the information object to the second polyhedron component at the second position coordinates using the set identification information.

19. The method of claim 18, wherein the first polyhedron component is a hexahedron.

20. The method of claim 18, wherein the first polyhedron component is a semi-transparent polyhedron component.

21. The method of claim 18, wherein the identification information comprises a name of the second polyhedron component.

22. The method of claim 18, wherein the identification information comprises the second position coordinates of the second polyhedron component.

23. The method of claim 18, wherein (b) comprises changing an external form of the information object into dotted lines if the information object is located inside the first polyhedron component having the identification information.

24. The method of claim 18, wherein (b) comprises providing the information object a location partially inside the first polyhedron component having the identification information.

25. The method of claim 24, wherein (b) comprises changing an external form of the information object into dotted lines if the information object is located partially inside the first polyhedron component having the identification information.

26. The method of claim 18, further comprising (d) changing a viewpoint in the user interface such that the information object which is moved inside the second polyhedron component appears enlarged to a user.

27. A non-transitory recording medium having a computer readable program recorded therein, the program for executing a method for providing a user interface, the method comprising:
(a) setting identification information that identifies a second polyhedron component at second position coordinates to a first polyhedron component at first position coordinates, wherein the second polyhedron component exists in a space that is different from that of the first polyhedron component;

(b) moving a display location of an information object selected by a user to the first polyhedron component at the first position coordinates; and (c) moving the display location of the information object to the second polyhedron component at the second position coordinates using the set identification information.

\* \* \* \* \*